US010485227B2

(12) United States Patent
Lubic

(10) Patent No.: US 10,485,227 B2
(45) Date of Patent: Nov. 26, 2019

(54) LIQUID ANT BAIT PACK WITH TEAR-AWAY TAB

(71) Applicant: WOODSTREAM CORPORATION, Lititz, PA (US)

(72) Inventor: Marko K. Lubic, Shillington, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 195 days.

(21) Appl. No.: 14/992,823

(22) Filed: Jan. 11, 2016

(65) Prior Publication Data
US 2017/0196214 A1    Jul. 13, 2017

(51) Int. Cl.
*A01M 1/20* (2006.01)
*B65D 75/32* (2006.01)
*B65D 75/58* (2006.01)

(52) U.S. Cl.
CPC ......... *A01M 1/2011* (2013.01); *B65D 75/324* (2013.01); *B65D 75/5811* (2013.01)

(58) Field of Classification Search
CPC ......... A01M 1/10; A01M 1/103; A01M 1/20; A01M 1/2005; A01M 1/2011; A01M 1/2044; A01M 2200/011; A01M 25/00; A01M 25/002; A01M 25/004
USPC ....................................................... D22/122
See application file for complete search history.

(56) References Cited

U.S. PATENT DOCUMENTS

| 3,613,994 | A | * | 10/1971 | Goodman | A01M 1/2044 |
| | | | | | 206/0.5 |
| 4,823,506 | A | * | 4/1989 | Demarest | A01M 1/2005 |
| | | | | | 43/107 |
| 6,195,933 | B1 | * | 3/2001 | Woodruff | A01M 1/2011 |
| | | | | | 43/131 |
| 6,532,696 | B2 | * | 3/2003 | Clark, III | A01M 1/2005 |
| | | | | | 43/107 |
| 6,632,696 | B2 | | 3/2003 | Clark, III et al. | |
| 6,675,527 | B1 | * | 1/2004 | Barere | A01M 1/14 |
| | | | | | 264/160 |
| 9,161,525 | B2 | | 10/2015 | King | |
| 9,497,952 | B2 | * | 11/2016 | Picas Meya | A01M 1/103 |
| 2010/0205850 | A1 | * | 8/2010 | Bernard | A01M 1/2011 |
| | | | | | 43/131 |
| 2014/0283436 | A1 | | 9/2014 | Mylva | |

FOREIGN PATENT DOCUMENTS

WO    WO-2015090990 A2 *  6/2015   ......... B65D 83/0055

* cited by examiner

*Primary Examiner* — Thanh Pham
(74) *Attorney, Agent, or Firm* — Jacobson Holman, PLLC.

(57) ABSTRACT

A liquid ant bait pack having a primary bait well and a plurality of feeding reservoirs for holding liquid bait is provided in which the walls of the feeding reservoirs as well as the primary bait well are sloped to facilitate ant access to the liquid bait held therein while reducing the risk of the ants falling into the bait and drowning. Ant access is further facilitated by dry platform areas positioned between the reservoirs. The inclusion of multiple feeding reservoirs, the bait well and the dry platform areas provides an increased area over which ants can simultaneously access the bait. The entrance to the bait pack is sealed during manufacture and then readily opened by the consumer using a tear-off tab that can removed without the need for any tools.

15 Claims, 4 Drawing Sheets

LIQUID ANT BAIT PACK WITH TEAR-AWAY TAB

BACKGROUND OF THE INVENTION

Field of the Invention

The present invention is related to the field of pest control and, more particularly, to plastic liquid insect bait assemblies, especially for ants.

Description of the Related Art

Numerous types of bait stations have been developed for attracting and killing insects, through provision of a supply of bait, normally one that is doped with an insecticide, and facilitating the application of the station at a location where it will attract and kill insects through ingestion of the edible bait. More specifically, various types of bait stations containing liquid insecticide have been available for some time for attracting roaches, ants, and other type of pests.

U.S. Pat. No. 6,532,696 ("the '696 patent") discloses a holder for liquid insect bait having an entrance cavity and a plurality of reservoirs that hold the bait. At least one of the sides of each of the reservoirs is perpendicular to the bottom of the reservoir which can create the risk that, in attempting to reach the liquid bait, the ants may fall into the liquid bait and drown rather than eating the bait and returning to their nest where they can spread the poison to the rest of the colony. In addition, the insect bait holder shown in the '696 patent requires that the user have scissors or other sharp utensil to open the holder prior to use.

Therefore, a need exists for an ant or insect bait trap that overcomes the foregoing disadvantages.

SUMMARY OF THE INVENTION

In view of the foregoing, the present invention is directed to a liquid insect or ant bait pack having a primary bait well, a plurality of ant feeding reservoirs with sloped walls, and a tear-off tab for opening the bait pack. The end of the bait pack having the primary bait well is referred to herein as the back of the bait pack, while the tear-off tab is provided at the opposite end or the front of the pack. Therefore, "front" portions of the feeding reservoirs and well are those portions nearest the tear-off tab while "rear" portions of these structures are those portions nearest the bait well. In addition, the invention is most often described hereinafter as an "ant bait pack"; however, it is understood that other small insect pests may also be advantageously drawn to the bait pack. Therefore, use of the term "ant bait pack" herein is not intended to limit the present invention to use of the bait pack for ants only but is intended to encompass any small pest insect.

The plurality of ant feeding reservoirs are in liquid communication with the primary bait well via a plurality of channels. The head of each channel is formed in the front side wall of the primary bait well, referred to herein as the outflow side wall of the primary bait well. The mouth of each channel opposite the outflow side wall of the primary bait well opens into a respective ant feeding reservoir. The outflow side wall of the primary bait well is sloped and the depth of the channels is less than the depth of the primary bait well and also less than the depth of the ant feeding reservoirs so that, when the bait pack is full and placed on a level surface, bottom side down, liquid bait in the bait pack flows through the channels between the primary bait well and the feeding reservoirs to reach a level of equilibrium. The slope of the ant feeding reservoir walls is steep enough to retain the desired amount of bait in the reservoirs and yet gentle enough to enable ants to climb both down and up the walls to access the bait and then exit the bait pack with little risk of falling into the liquid held in the reservoirs and drowning. In addition, the reservoirs are laterally separated from one another by substantially flat or "dry" platform areas from which ants may access the bait without even venturing into the reservoirs when the bait level is high enough. Dry areas could also be provided around the outer edges of the reservoirs for the same purpose. Having a plurality of ant feeding reservoirs, each of which has sloped walls that can be accessed easily by the ants, as well as dry platform areas between and/or around the reservoirs, increases the number of ants that are able to feed simultaneously as compared with bait stations having a single bait well or fewer reservoirs, as well as bait stations with walls that are perpendicular or nearly perpendicular with respect to the bottom of the bait station and/or the underlying support surface. Finally, the tear-off tab enables the user to easily open the bait pack without the need for any tools.

Accordingly, it is an object of the present invention to provide an ant bait pack that is able to contain a large quantity of liquid bait in both a primary well and a plurality of feeding reservoirs in liquid communication with the primary well.

Another object of the present invention is to provide an ant bait pack in accordance with the preceding object in which the bait pack includes a plurality of individual readily accessible feeding reservoirs to provide a greater area over which ants can access the liquid bait and increasing the number of ants that can feed simultaneously.

A further object of the present invention is to provide an ant bait pack in accordance with the preceding objects in which the walls of the reservoirs are sloped at an angle that facilitates the ease with which ants can access the liquid bait without falling into the bait-holding reservoirs and then exit the bait pack to return to their colony.

Yet a further object of the present invention is to provide an ant bait pack in accordance with the preceding objects in which the reservoirs are in liquid communication with the primary bait well via channels having sloped walls and a shallower depth than both the well and the reservoirs so that the supply of bait remains in the primary well and the reservoirs as the amount of bait is reduced through consumption.

A further object of the present invention is to provide an ant bait pack in accordance with the preceding objects in which the channels allow bait to flow between the primary bait well and the reservoirs.

A still further object of the present invention is to provide an ant bait pack in accordance with the preceding objects in which the reservoirs are laterally separated from one another and/or surrounded by dry platform areas that enable ants to access the liquid bait without even entering the reservoirs when the liquid level is sufficiently high, i.e, when the level of bait in the bait pack constitutes a full or nearly full level, as when the trap is initially opened for use.

Another object of the present invention is to provide an ant bait pack in accordance with the preceding objects in which the bottom surfaces of the reservoirs and the primary bait well are on the same or substantially the same plane so that, when the bait pack is on a level horizontal surface, the height of the upper surface of the liquid bait is substantially the same in both the bait well and the reservoirs.

Yet another object of the present invention is to provide an ant bait pack in accordance with the preceding objects in which the bait pack has a tear-off tab that enables the consumer to open the bait pack easily without the need for any tools.

Yet another object of the present invention is to provide an ant bait pack in accordance with the preceding objects in which the bait pack, when prefilled and sealed, fully contains the bait within the sealed bait pack package, the bait being exposed only when the pack is readied for usage by removal of the tear-off tab to create an entryway for the ants.

Still another object of the present invention is to provide an ant bait pack in accordance with the preceding objects that has a low profile so as to fit in areas with limited accessibility to any children, pets, or the like.

Yet another object of the present invention is to provide an ant bait pack in accordance with the preceding objects that is easy to use and that can be easily disposed of, along with all the ants contained therein, after the bait has been consumed.

A further object of the present invention is to provide an ant bait pack in accordance with the preceding objects that remains sealed until use and that can, when opened, remain attractive and palatable as a bait for an extended period of time due to its compactness and preferably small entrance opening, while protecting the consumer as well as children and pests from possible contact with the bait both before and during use of the bait pack.

Yet another object of the present invention is to provide an ant bait pack in accordance with the preceding objects that, due to its structural configuration which makes it resistant to the inflow of rain water during common showers, may be used both indoors or outdoors.

Yet a further object of the present invention is to provide an ant bait pack in accordance with the preceding objects that is not complex in structure and which can be manufactured at low cost and efficiently used and then disposed of by the consumer.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
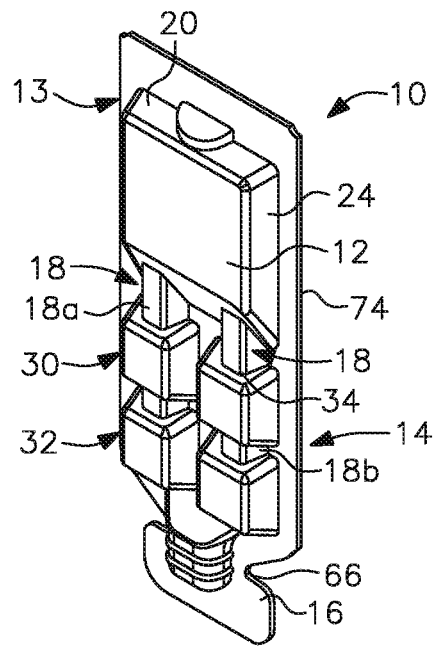
FIG. 1 is a perspective view of the bottom side of a preferred embodiment of a liquid ant bait pack in accordance with the present invention.
Figure 2:
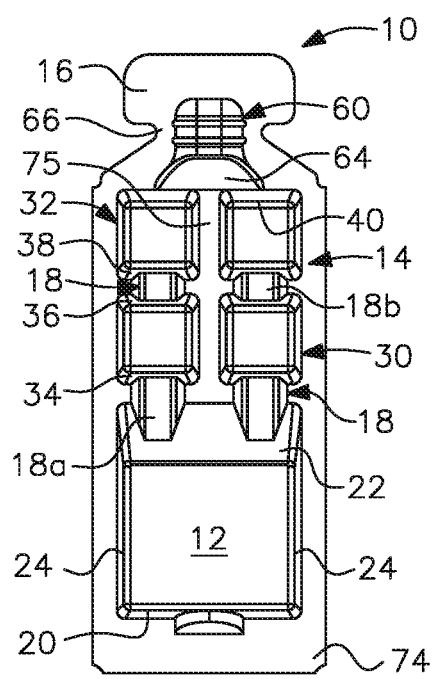
FIG. 2 is a plan view of the bottom side of the bait pack shown in FIG. 1.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIGS. 1-5, the present invention is directed to an insect or ant bait pack having a preferred embodiment generally designated by reference numeral 10. The ant bait pack 10 includes a primary bait well 12, a plurality of ant feeding reservoirs generally designated by reference numeral 14, and a tear-off tab 16 for opening the bait pack 10. The plurality of ant feeding reservoirs 14 are in liquid communication with the primary bait well 12 via a plurality of channels generally designated by reference numeral 18.

Figure 3:
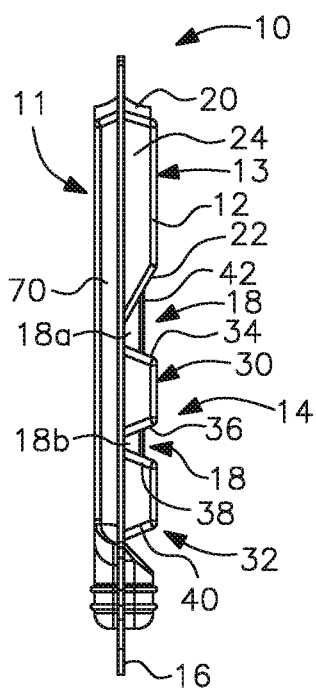
FIG. 3 is a side view of the bait pack shown in FIGS. 1 and 2.
Figure 4:
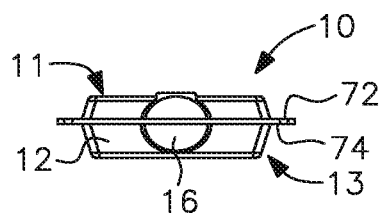
FIG. 4 is a front-end view of the bait pack shown in FIGS. 1-3.
Figure 5:
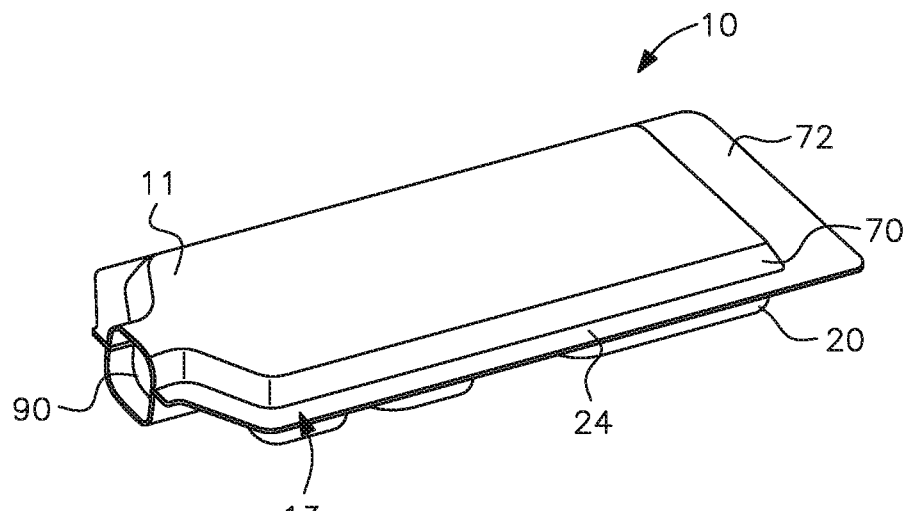
FIG. 5 is a perspective view of the top side of the bait pack shown in FIGS. 1-4 after the tear-off tab has been removed.
Figure 6:
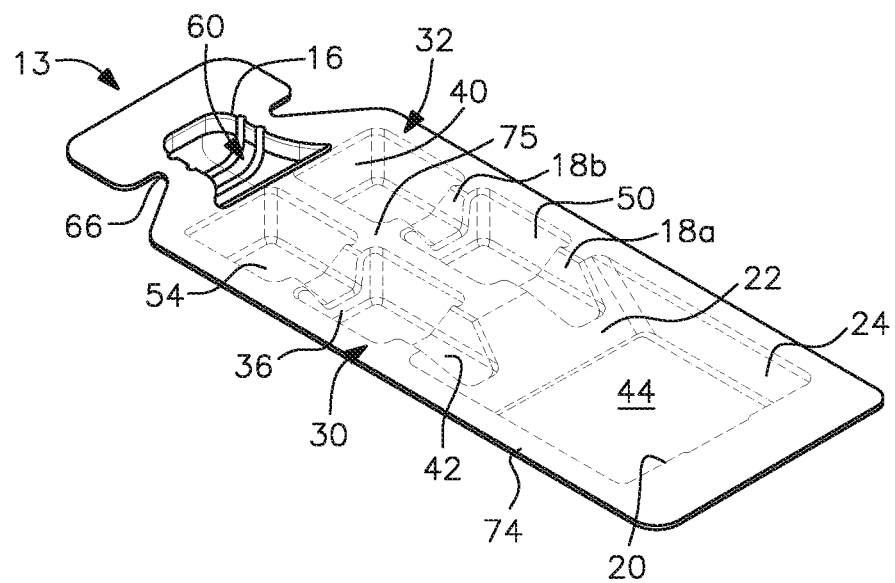
FIG. 6 is a top perspective view of the bottom half of the bait pack shown in FIGS. 1-5.
Figure 7:
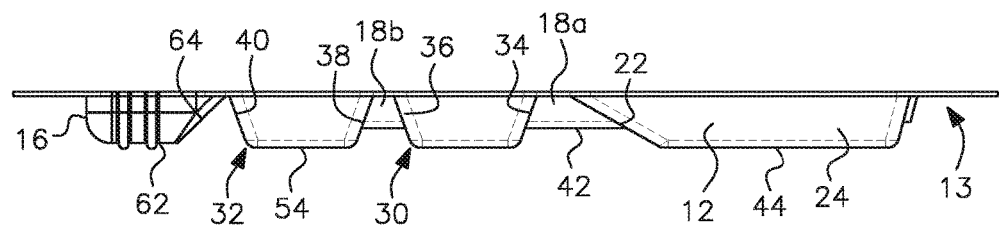
FIG. 7 is a side view of the bottom half of the bait pack shown in FIG. 6.
Figure 8:
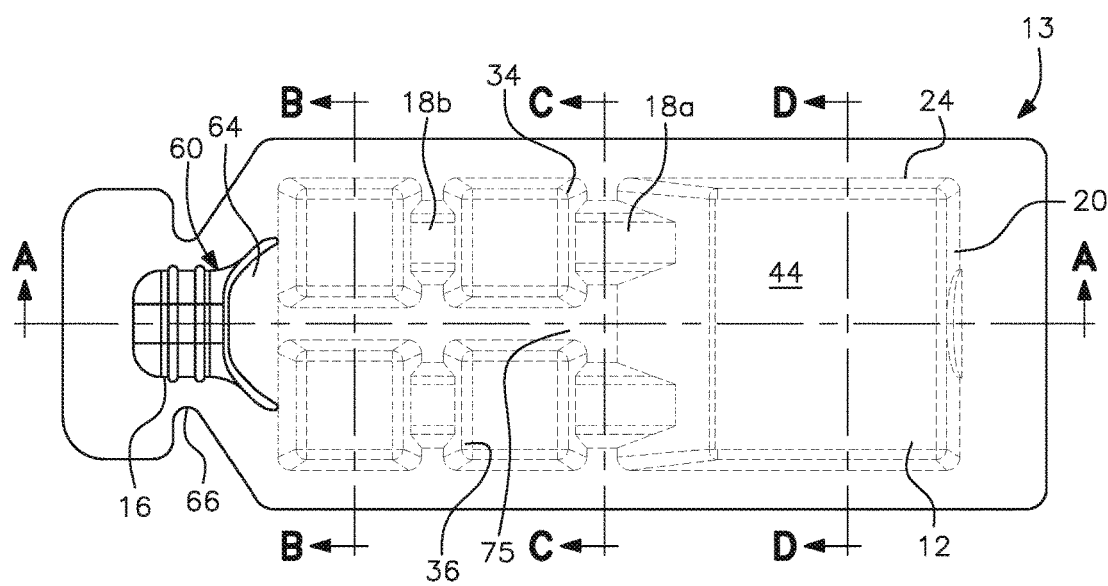
FIG. 8 is a bottom view of the bottom half of the bait pack shown in FIG. 6.
Figure 9:
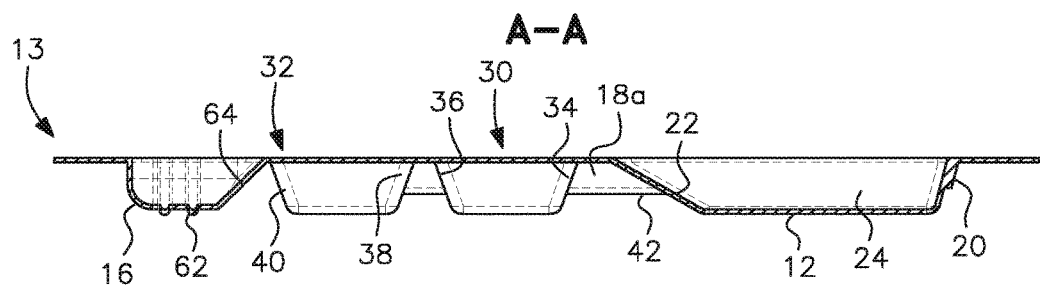
FIG. 9 is a sectional view taken along line A-A of the bait pack bottom half shown in FIG. 8.
Figure 10:
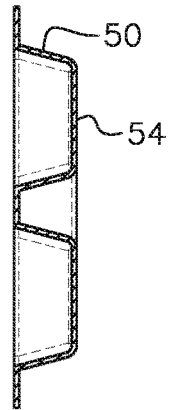
FIG. 10 is a sectional view taken along line B-B of the bait pack bottom half shown in FIG. 8.

The bait pack 10 is preferably formed of a single sheet of a polymer film folded over to create an upper half 11 and a lower half 13 as shown in FIGS. 3-5. The upper and lower halves 11, 13 have flanges 72, 74, respectively, that are brought into abutment with one another and sealed during manufacture in a manner like that described in the '696 patent.

The primary bait well 12, the feeding reservoirs 14 and the channels 18 are molded into the lower or bottom half 13. The primary bait well 12 is generally rectangular with a closed back wall 20 and an opposite outflow front wall 22, joined by two side walls 24 that extend in a generally longitudinal or "upstream-downstream" direction between the closed back wall and the outflow front wall. As used herein, "downstream" is used to refer to an element having a spacial placement such that the element receives an inflow of liquid bait from an "upstream" element that is nearer to the primary well 12 at the back of the bait pack. The primary well 12 represents the source of the liquid bait "flow" and therefore constitutes the head of the "stream" at the back end of the bait pack. While the terminology of "upstream", "downstream" and "flow" suggests an active or ongoing movement of the bait in a single direction, this is not actually the case, in most instances, as the liquid bait can move "upstream" or "downstream" in response to elevation of the front end of the bait pack or elevation of the back end of the pack, respectively. Therefore, the "flow" and "stream" terminology is used for clarity of structural description and not to describe an actual or fixed flow dynamic or movement of the liquid bait.

An upstream end or head of each channel 18 is formed in the outflow front wall 22 of the primary bait well. The downstream end or mouth of each channel opposite the outflow front wall 22 of the primary bait well 12 opens into a respective ant feeding reservoir 14 downstream of the primary bait well.

Each feeding reservoir 14 is generally rectangular having an input side into which the mouth of the channel opens. According to the embodiment shown herein in FIGS. 1-13, there are four ant feeding reservoirs formed as an upstream pair, generally designated by reference numeral 30, and a downstream pair, generally designated by reference numeral 32. In this two-pair configuration, each channel has an upstream portion 18*a* and a downstream portion 18*b*. The upstream portion 18*a* of each channel 18 extends from the primary bait well 12 to the input side or back wall 34 of a respective one of the first pair of ant feeding reservoirs 30. The downstream portion 18*b* of each channel 18 extends from an outlet or front wall 36 of the respective one of the first pair of ant feeding reservoirs 30 to the input or back side wall 38 of a respective one of the second pair of ant feeding reservoirs 32 located "downstream" of the first ant feeding reservoirs 30. Hence, the upstream pair of reservoirs 30 is in liquid communication with the downstream pair of reservoirs 32 through respective channel downstream portions 18*b*. The downstream or front wall 40 of the second or downstream pair of reservoirs 32 is nearest the tear-away tab 16 at the front of the bait pack 10.

The depth of the bait storage well 12 is between about 5 mm and about 7 mm, and preferably about 6 mm (0.236"). When the pack is filled with liquid bait, the fluid height is below an upper edge formed by the flange 74 of the bottom half 13. According to the preferred embodiment, the bottom surfaces of the reservoirs and the primary bait well are on the same or substantially the same plane so that the upper surface or height level of the liquid bait when the bait pack is on a level horizontal surface is substantially the same in the reservoirs and the bait well. This equilibrium from the rear to the front of the bait pack increases the size of the feeding area and ensures that ants can access the bait in the reservoirs as easily as in the bait well, and vice versa.

The bottom surface 42 of the channel 18 is higher than the bottom surface 44 of the bait storage well 12, i.e., the channel is not as deep as the well, with the depth of the channel being between about 3.4 mm and about 3.9 mm, and preferably about 3.7 mm (0.146"). The depth of the channels 18 is also less than the depth of the ant feeding reservoirs which have approximately the same depth as the primary well so that, as just noted, when the bait pack is positioned for use, preferably horizontally, the channels allow the liquid bait to flow into and be held in the primary well 12 and the feeding reservoirs 14 at a substantially uniform level when equilibrium is reached. As the bait is consumed and the bait level in the reservoirs and bait well falls below the bottom of the channels, fluid in the channels will flow into the reservoirs and bait well. In this way, the bait held in the channels when the bait pack is full is, as the bait is consumed and its level drops, "fed" into the reservoirs and bait well, emptying the channels and retaining the remaining bait in the reservoirs and well. This is advantageous because the reservoirs and bait well provide a larger access area for multiple ants to feed.

To facilitate the ease and safety with which ants can access the bait, and also to ensure easy flow of the bait from the well 12 to the reservoirs 30 and 32, the angular slope of the outflow front wall 22 of the primary bait well 12, from the bottom surface 44 of the bait well to the top of the outflow front wall 22 of the well, which is also the upper edge of the lower half 13 corresponding with the flange 74, is between about 30° and about 60°, with angles closer to about 30° being preferred.

The ant feeding reservoirs 14 also have angled side walls 50 (see FIGS. 10 and 11), with the side walls being those walls that extend in a generally upstream-downstream direction between the inlet back wall 34, 38 and the outlet front wall 36, 40 of the reservoir pair 30, 32, respectively. The slope of the feeding reservoir side walls 50 is steep enough to retain the desired amount of liquid bait and yet gentle enough to enable ants to climb down the walls and access the bait, and then turn and climb back up and out of the pack, without falling into or being mired in the liquid held in the reservoirs and drowning. Preferably, the angle of each of the reservoir side walls 50 is between about 45° and about 75°, with angles closer to 75° being preferred.

To better enable the ants to gather and, when bait levels are sufficiently high, as when the bait pack is newly opened and therefore full, to even access the liquid bait without having to climb down into the reservoirs or the primary well, the ant bait pack according to the preferred embodiment shown herein includes a plurality of dry platform areas 75 between the reservoirs. The width of the platform areas 75 is between about 3.6 mm (0.143") and about 9.5 mm (0.375°). The reservoirs are laterally separated from one another by these dry platform areas 75 and may also be surrounded thereby (not shown).

According to the embodiment shown herein, the angle of the downstream front wall 36, 40 of each of the reservoir pairs 30, 32, respectively, is between about 30° to about 70° from the bottom surface 54 of the reservoirs to the top of the front wall 36, 40. The angle of the upstream or inlet back wall 34, 38 of each of the reservoir pairs 30, 32, respectively, is also between about 30° and about 70°. Preferably, the angles of both the front and back walls of the reservoirs are closer to about 70°.

Figure 11:
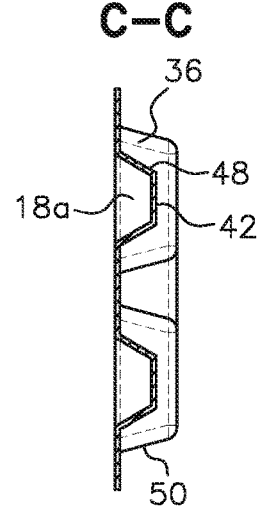
FIG. 11 is a sectional view taken along line C-C of the bait pack bottom half shown in FIG. 8.
Figure 12:
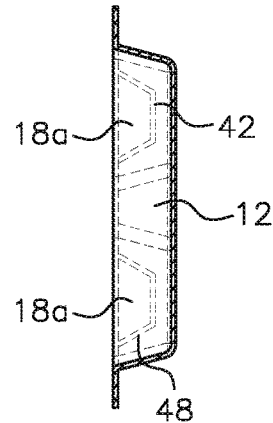
FIG. 12 is a sectional view taken along line D-D of the bait pack bottom half shown in FIG. 8.

The side walls 48 of both the upstream and downstream portions 18*a*, 18*b* of the channels are also angled (see FIGS. 11 and 12). The angle of the side walls 48 of the channel upstream portions 18*a*, which channel portions 18*a* extend in a generally upstream-downstream direction between the primary bait well 12 and the first pair of ant feeding reservoirs 30, is between about 50° and about 70°, and preferably about 60°. The angle of the channel downstream portions 18*b* which extends from the first or upstream pair of ant feeding reservoirs 30 to the second or downstream pair of ant feeding reservoirs 32 is also between about 50° and about 70°, and preferably about 60°.

The front of the bait pack with the tab 16 is provided with an entrance cavity generally designated by reference numeral 60. The cavity 60 has a flattened bottom portion 62 and a ramp 64 that provides a passage between the entrance cavity and the downstream pair of reservoirs 32. The front entrance cavity 60 has a scored line 66 for removing the tear-off tab 16. Removal of the tear-off tab 16 creates an access opening 90 (see FIG. 5) that opens the entrance cavity 60 to allow the insects to crawl into the bait pack and up the ramp 64 to attain access to the liquid bait contained in the downstream pair of reservoirs 32. The ants may continue crawling toward the back end of the bait pack to the upstream pair of reservoirs 30, and then to the bait well 12 at the rear or back end of the bait pack, as previously explained.

The bait pack is made with a moldable polymer such a polyethylene, propylene, or any other polymer that is preferably a transparent film to allow ready viewing by the user so that he/she can see when the liquid bait previously deposited therein has become depleted, or filled with dead insects, and requires replacement.

The upper half 11 of the bait pack 10 is preferably formed with a slightly elevated central portion 70 (see FIGS. 3-5), to add some clearance within the bait pack during its usage. The flanges 72, 74 around the perimeters of each of the upper and lower halves 11, 13, are joined (see FIG. 4), such as by heat sealing, or other adhesive, during manufacture of the bait pack in a manner like that described in the '696 patent.

Figure 13:
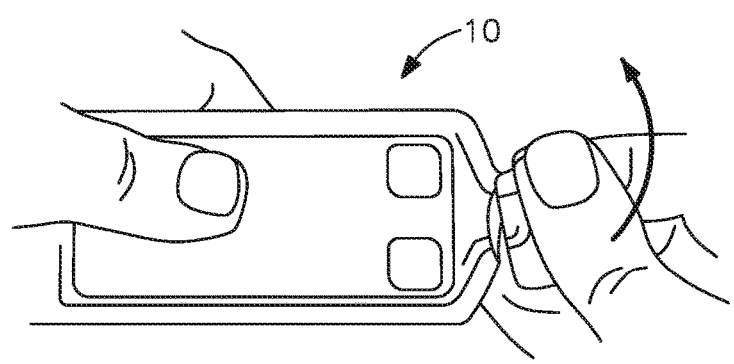
FIG. 13 shows a consumer removing the tear-off tab of the preferred bait pack embodiment of the present invention in preparation for use.

When the bait pack is ready for use, the consumer simply positions the bait pack so that the back end is arranged downwardly, ensuring that all of the liquid sealed therein will flow to the primary bait well at the back of the bait pack. Then, as shown in FIG. 13, the consumer tears off the tab 16 along the score 66 so as to create the access opening 90 to the otherwise previously sealed container. The tab may be readily torn off by hand without the need for any tools or cutting devices. The bait pack may then be rested on a level surface, preferably at a location that is inaccessible to children, pets, or the like, but yet readily available to the insects desired to be eradicated. At this time, when arranged horizontally, with its lower half resting upon the floor with the bottoms of the reservoirs and the primary well on the same plane, the liquid will flow or be distributed, as previously explained, between the primary well, and the first and second pairs of reservoirs to reach equilibrium where the bait then remains static. Having the liquid bait in all of the reservoirs and in the well, while providing the dry platform areas in between the reservoirs, makes it possible for the greatest number of eating areas to be readily accessible to ants and other insects. The insects ingest the bait and either die in situ, or carry the poisonous bait back to the colony, so as to spread the insecticide or pesticide to the other members of the colony, and cause their demise. Once the bait has been totally consumed or becomes sufficiently stale as to lose its attraction to the insects, the bait pack can be discarded with all the dead insects contained therein.

The bait pack as described herein may be used with any of a number of liquid baits readily available upon the market. These baits may include those liquid baits that have a viscosity close to that of water as well as baits having a higher viscosity.

Variations or modifications to the subject matter of this invention may occur to those skilled in the art upon reviewing the description of this invention. Such variations, if within the scope and spirit of this invention, are intended to be encompassed within the scope of any claims to invention made herein. The description of the preferred embodiment, as shown in the drawings, are set forth for illustrative purposes only.

What is claimed is:

1. A sealed ant bait pack comprising:
   an upper half and a lower half joined to one another along abutting flanges on each half to form a sealed container fully containing a quantity of liquid ant bait;
   a tear-away tab at a front end of said container that is removable by hand to reveal an access opening into the sealed container, the bait only being exposed through said access opening upon removal of said tear-away tab;
   said lower half of said container when said container is in use having a primary bait well at a rear end of the container, a first pair of reservoirs adjacent the bait well and a second pair of reservoirs positioned between the first pair of reservoirs and the tab at the front end of the container, each of said reservoirs in said first pair being in liquid flow communication with said bait well via a respective upstream channel and also being in liquid flow communication with a respective one of said reservoirs in said second pair via a respective downstream channel when said container is in use, a bottom surface of the bait well being on a same plane as bottom surfaces of the first and second pairs of reservoirs, and a depth of the channels being less than a depth of the bait well and also less than a depth of the reservoirs, the liquid bait flowing into and through said channels to be distributed between the primary bait well and the first and second pairs of reservoirs to reach equilibrium when the bait pack is full and positioned for use and, as the liquid bait within the bait pack is consumed during use of the bait pack and a level of the liquid bait falls below a bottom of the channels, liquid bait held within the channels flows into the primary bait well and into the first and second pairs of reservoirs to retain the remaining liquid bait in said first and second pairs of reservoirs and said bait well.

2. The ant bait pack as set forth in claim 1, wherein said bait well is generally rectangular with a closed rear wall, two side walls and an outflow front wall opposite said rear wall, said outflow front wall being sloped at an angle of between about 30° and about 60° to facilitate ant entry and exit from the bait well and the bait contained therein.

3. The ant bait pack as set forth in claim 2, wherein each of said reservoirs is generally rectangular and has a front wall and a rear wall joined by two side walls, said front wall and said rear wall being angled at about 70° from the bottom surface of the reservoirs to a top of the respective front or rear wall.

4. The ant bait pack as set forth in claim 3, wherein each of said reservoir side walls is angled at about 75°.

5. The ant bait pack as set forth in claim 2, wherein said channels have side walls angled at about 60°.

6. The ant bait pack as set forth in claim 1, wherein each of said reservoirs in both pairs of reservoirs is generally rectangular and has a front wall and a rear wall joined by two side walls, said front wall and said rear wall being angled at about 70°, each of said reservoir side walls being angled at about 75°.

7. The ant bait pack as set forth in claim 6, wherein said upstream channels and said downstream channels each have side walls angled at about 60°.

8. The ant bait pack as set forth in claim 1, wherein said reservoirs are separated from one another by dry platform areas having a generally flat surface that is above a level of liquid bait in said reservoirs.

9. A sealed ant bait pack comprising:
   a sealed container having a bottom portion with a plurality of bait holding reservoirs formed therein, said bait reservoirs being in liquid communication with one another via a plurality of channels;
   a single tear-away tab at a front end of said container that is removable by hand to reveal an access opening into the sealed container, said sealed container being sealed other than at the access opening when the tab is removed;
   a bait well positioned at a rear end of the container opposite the front end;
   said plurality of reservoirs including a first pair of reservoirs adjacent the bait well and a second pair of reservoirs positioned between the first pair of reservoirs and the tab at the front end of said container when the ant bait pack is in use, each of said reservoirs in said first pair being in liquid flow communication with said bait well via a respective upstream channel, each of said reservoirs in said first pair also being in liquid flow communication with a respective one of said reservoirs in said second pair via a respective downstream channel, bottom surfaces of said first and second pairs of reservoirs being on a same plane with a bottom surface of said bait well, a depth of said channels being less than a depth of the bait well and also less than a depth of the reservoirs;

a quantity of liquid ant bait held in the bait well and in each of said reservoirs, the liquid bait flowing into and through said channels to be distributed between the primary bait well and the first and second pairs of reservoirs to reach equilibrium when the bait pack is full and positioned for use and, as the liquid bait within the bait pack is consumed during use of the bait pack and a level of the liquid bait falls below a bottom of the channels, liquid bait held within the channels flows into the primary bait well and into the first and second pairs of reservoirs to retain the remaining liquid bait in said first and second pairs of reservoirs and said bait well; and a plurality of dry platform areas between and separating the reservoirs, said dry platform areas having a generally flat surface that is above a level of the liquid bait held in said reservoirs so that ants can access the liquid bait while staying on the platform areas when the liquid bait level in the reservoirs is high enough.

10. The ant bait pack as set forth in claim 9, wherein each of said reservoirs has walls sloped at an angle of between about 30° and about 75° to facilitate ant entry and exit from the reservoirs to consume the bait contained therein as the bait level is lowered while reducing a risk that the ants will fall into the reservoirs and drown.

11. The ant bait pack as set forth in claim 9, wherein each of said reservoirs in both pairs of reservoirs is generally rectangular and has a front wall and a rear wall joined by two side walls, said front wall and said rear wall being angled at about 70°, each of said reservoir side walls being angled at about 75°.

12. The ant bait pack as set forth in claim 11, wherein said upstream channels and said downstream channels each have side walls angled at about 60°.

13. The ant bait pack as set forth in claim 12, wherein said bottom portion has a perimeter flange and said container includes an upper portion with a perimeter flange, said bottom and upper portions being sealingly joined to one another along said perimeter flanges during manufacture.

14. The ant bait pack as set forth in claim 12, wherein said bait well is generally rectangular and includes a closed rear wall, two side walls and an outflow front wall opposite said rear wall, said outflow front wall being sloped at an angle of between about 30° and about 60°.

15. The ant bait pack as set forth in claim 9, wherein said bait well is generally rectangular and includes a closed rear wall, two side walls and an outflow front wall opposite said rear wall, said outflow front wall being sloped at an angle of about 30°.

* * * * *